(12) United States Patent
Toutonghi et al.

(10) Patent No.: US 6,438,744 B2
(45) Date of Patent: *Aug. 20, 2002

(54) DYNAMIC MAPPING OF COMPONENT INTERFACES

(75) Inventors: Michael J. Toutonghi; Tracy C. Sharpe, both of Seattle, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,987

(22) Filed: Jul. 15, 1998

(51) Int. Cl.[7] ................................................ G06F 9/45
(52) U.S. Cl. .................... 717/137; 717/106; 717/107; 717/108; 717/116; 717/117; 717/118; 717/162; 717/163; 717/164; 717/165
(58) Field of Search .................... 717/1, 4, 11, 137, 717/106–108, 116–118, 162–165

(56) References Cited

U.S. PATENT DOCUMENTS

| | | | |
|---|---|---|---|
| 5,515,536 A | 5/1996 | Corbett et al. | |
| 5,931,900 A | 8/1999 | Notani et al. | 709/201 |
| 5,963,955 A | 10/1999 | Melahn et al. | 707/103 |
| 5,995,945 A | 11/1999 | Notani et al. | 705/28 |
| 6,209,125 B1 | 3/2001 | Hamilton et al. | |

OTHER PUBLICATIONS

Hughes, "JavaBeans and ActiveX go head to head", http://www.javaworld.com/, pp. 1–11, Mar. 1997.*

"The Common Object Request Broker: Architecture and Specification", Digital Equipment Co., Hewlett–Packard Co., HyperDesk Co., Object Design, Inc., SunSoft, Inc., pp. 19–108, Dec. 1993.*

Evans et al., "Zones, Contracts and Absorbing Change: An Approach to Software Evolution", ACM, pp. 415–434, Nov. 1999.*

Claverie, "Working the 'NET: developing applications with the Internet Information Server and Visual Basic ActiveX controls", ACM, pp. 158–162, Apr. 1998.*

Java.sun.com, "Java Plug–In Scripting", http://java.sun.com/, pp. 1–29, Oct. 1999.*

"The Common Object Request Broker: Architecture and Specification", CORBA V2.0, Jul. 1995.

Brockschmidt, Kraig, "Inside OLE", Second Edition, Chapter 3: Type Information, pp. 145–186, Chapter 14: OLE Automation and Automation Objects, pp. 635–760, Microsoft Press, 1995.

Vanhelsuwé, Laurence, "Mastering Java Beans", Chapter 10: Java Core Reflection and Bean Introspection, pp. 592–652, 1997.

Robinson, Steve and Krasilchikov, Alex, "ActiveX Magic: An ActiveX Control and DCOM Sample Using ATL", MSDN Online Web Workshop, May 1997.

"SunSoft Delivers Critical Technology for Networked Object Interoperability", Sun.com, 1995.

(List continued on next page.)

*Primary Examiner*—Kakali Chaki
*Assistant Examiner*—Ted T. Vo
(74) *Attorney, Agent, or Firm*—Klarquist Sparkman, LLP

(57) ABSTRACT

The dynamic mapping from an ActiveX component model to a JavaBean model is disclosed. In one embodiment, an ActiveX compatible object is created at run-time for those JavaBean components that an ActiveX client application wishes to utilize. In another embodiment, upon a call to CoGetClassObject or related methods using class identifiers, a COM-callable wrapper is generated and a mapping table containing COM dispatch identifiers is scanned to ensure the dispatch identifiers are unique. If they are not, the dispatch identifiers associated with JavaBean component interfaces are adjusted to make them unique.

12 Claims, 5 Drawing Sheets

OTHER PUBLICATIONS

JavaX White Paper; An Approachable Examination of Java, JavaBeans, JavaScript and all the Relating Java Technologies, pp. 1–33, by Jothy Rosenberg of NovaSoft Systems, Inc., 1997.

"JavaBeans Migration Assistant for ActiveX: Migrating ActiveX Components to JavaBeans", *IBM Corporation, www7 . software. ibm*, IBM posted, Retrieved from the Internet on Nov. 29, 1999, 2 p., (Apr. 5, 1998).

"SUN Enriches JavaBeans Component Architecture", *Press Release, SUN Microsystems, Inc., www.sun.com/smi/Press/sunflash/>*, Retrieved from the Internet on Dec. 3, 1999, 6 p., (Jul. 1997).

"SUN Microsystems' JavaBeans Development Kit in Full–Scale Deployment", *Press Release, SUN Microsystems, Inc., www.sun.com/smi/Press/sunflash/>*, Retrieved from the Internet on Dec. 3, 1999, 3 p., (Mar. 1997).

"SUN Microsystems, Inc., Announces JavaBeans Develpment Kit", *Press Release, SUN Microsystems, Inc., www.sun.com/smi/Press/sunflash/>*, Retrieved from the Internet on Dec. 3, 1999, 3 p., (Dec. 1996).

"The JavaBeans Bridge for ActiveX", *Datasheet, SUN Microsystems, Inc., http://java.sun.com/beans/software/bridge*, Retrieved from the Internet on Nov. 29, 1999, 2 p., (Feb. 1998).

Flanagan, D., *Java in a Nutshell, A Desktop Quick Reference, 2nd Edition*, O'Reilly & Associates, Inc., (May 1997).

Harmon, T., "Java SDK 2.0: A Two–Way Bridge Between ActiveX and Java", *Article [retrieved on Jun. 20, 2000]*, 1–11, (1998).

Java, "Java Plug–In Scripting", *Retrieved from <URL: wgsiwyg://160'http://msdn.microsoft.com/library/periodic/period96/visualj.htm>*, 1–28, (1996).

Java, "The Source for Java Technology", *Java Spot News Apr. '97 Press Releases Press Archives Spot News*, 1–3, (1997).

Locke, J., "Taking the Wraps off Microsoft Visual J++", *Article [online] Microsoft Corporation [retrieved Jun. 20, 2000]*, 1–17, (1996).

Rogerson, D., *Inside Com—Microsoft's Component Object Model*, Published by Microsoft Press, Redmond, WA, 1–376, (1997).

* cited by examiner

DYNAMIC MAPPING OF COMPONENT INTERFACES

FIELD OF THE INVENTION

This invention relates generally to software component interfaces, and more specifically to dynamic mapping of such interfaces.

BACKGROUND OF THE INVENTION

The evolution of computer software development has included the introduction of new development techniques and methods. These techniques and methods have included new programming languages, new libraries, new development methodologies, and new development environments. Often these techniques and methods are produced to improve software development productivity or to extend software development capability.

Software components are one technique to improve software development productivity and program flexibility. Reusable software components are designed to apply the power and benefit of reusable, interchangeable parts from other industries to the field of software development. Software components have standard interfaces making them interchangeable and reusable. Examples of software components tend to be oriented toward user interface elements. They can be simple like familiar push buttons, text fields list boxes, scrollbars and dialogs, or they can be more complex, such as calculators and spreadsheets.

Microsoft's ActiveX and the JavaBeans specification are two examples of software component models. ActiveX is a component environment commonly used by applications written in Microsoft's Visual Basic and Visual C++ programming languages. ActiveX can generally be defined as a specification for a software development methodology and an API that allows software components to be dynamically interchanged. ActiveX makes use of the Component Object Model (COM). Further details of COM are described in Dale Rogerson, "Inside COM," 1997 (ISBN 1-57321-349-8) which is hereby incorporated by reference.

The JavaBeans specification for the Java programming language defines an environment for developing components known as "beans." The JavaBeans specification defines a bean generally as a reusable software component that can be manipulated visually in a builder tool.

ActiveX components (also known as "controls") and beans share the quality that when used within their intended environments, new or alternative components can be substituted for old components without requiring any changes to the application using the component. In addition, software components can be easily incorporated into new programs using software building tools, thereby freeing the developer from writing code to implement the functionality provided by the component.

Unfortunately, the interfaces provided by differing programming environments are not always compatible with one another. The reasons for the incompatibility vary, but common causes are incompatible function parameter passing protocols, incompatible data structure definitions and incompatibilities between programming language conventions between different languages or between different vendors' compilers for the same programming language. As a result, it is necessary to convert from one interface to another when incompatibilities are encountered. The process of converting the methods, properties and events of a source class, library or language to methods, properties and events of a differing target class, is generally known as mapping. A specific example where mapping is required because of an incompatibility exists when an application designed to use an ActiveX control desires to use a Java bean component.

There are three main reasons why ActiveX controls are incompatible with Java beans. First, the data structures representing ActiveX controls and beans, while containing similar information, are defined differently. These differences include the order of elements in the data structure and the naming convention used for the elements. In addition, elements appearing in one data structure may be missing in the other or may appear in combination with different elements.

Second, the data contained within the object data structure are populated at different times. All of the data required to define an object representing an ActiveX control can be determined at the time the source code is compiled or interpreted. However, in JavaBeans, the data required to define a bean interface object cannot be completely determined through the source code alone. The data that cannot be derived via the source code must be supplied at run-time when the source is interpreted by the Java Virtual Machine (VM). The information that must be supplied by the Java VM generally relates to data type identifiers for the methods, properties and events defined by the bean.

Third, the interfaces defined by the two component models are different. Interfaces are used to connect objects defined by the component model. ActiveX and the JavaBeans specification define their own interfaces to connect their respective objects together. While they perform similar functions, the two interfaces are different and operate on different objects, and are therefore incompatible.

Alternative attempts to allow an ActiveX client to interface with a Java bean have used a technique known as "static mapping" to map between ActiveX controls and Java beans. Static mapping involves invoking a packager application that gathers data based on user input. The packager application also reads the user specified Java source code and scans the source for bean definitions. When a bean is found, the packager application generates three types of files. The first file type is a Java class file that can be interpreted by the Java VM (Virtual Machine). The second file type is a registry file that must be imported into the registry of the computer running an ActiveX client. The third file type is a type library file that contains a COM compatible definition of the methods, properties and events defined by the bean. The files generated by the packager are populated with data gleaned from scanning the source, and include items such as the public methods, properties and events for the top-level class defined in the bean.

Static mapping has several disadvantages. First, the packager application can only generate mappings for those classes representing beans defined in the Java source code scanned by the application. It is common in object-oriented languages for a class to propagate its methods, properties and events to lower-level classes that inherit from the top-level class. The end result of static mapping is that only the top-level, or explicitly called out Java classes, have ActiveX compatible objects generated. Mappings can only be generated for top-level classes within the bean, mappings cannot be generated for lower-level classes. As a result, it is possible that a significant number of the methods, properties and events that define classes will be inaccessible to a ActiveX client application.

A second disadvantage to static mapping is that the mapping is incomplete. Static mapping methods scan the source code at a particular point in time, and then generate interface files based on the source code. In effect, static mapping produces a snapshot of a bean's state at a particular point in time. A developer may add methods, properties and events to the bean after the snapshot has been produced by the static mapping method. An ActiveX client using a statically mapped interface will be unable to use the newly defined methods, properties and events.

In addition, as discussed above, there is a significant amount of information about a bean that must be provided by the Java VM, and as a result the information is available only during the run-time of a Java program (i.e. while the Java program is executing on the computer). Since the static mapping method scans the files before the Java program is run, not all of the information that must be supplied at run-time is available to the packager application. As a result, a significant portion of the data describing the bean will not be available when the ActiveX client instantiates the bean, resulting in reduced bean functionality.

A third disadvantage is that static mapping requires additional system management effort. This is because the static mapping information is contained in several files. These files must be installed as a separate step from the installation of Java or ActiveX. In addition, these files must be located in specific directories specified by the registry file in order for the system to work properly. If the user wishes to move these files, additional work is required to insure that the registry entries point to the correct file location.

Therefore, there is a need for a technique that allows software developers to map between component models defined in different development environments that can provide for a more complete mapping of component objects and information within the object, while reducing the development and maintenance overhead of current mapping techniques.

SUMMARY OF THE INVENTION

The above-mentioned shortcomings, disadvantages and problems are addressed by the present invention, which will be understood by reading and studying the following specification. The invention describes dynamically mapping between class objects representing components defined in two differing software development environments. In one embodiment, a computerized system has an operating system that provides interfaces for controlling two components, with each component interface having methods, properties and events. A client program designed to utilize an interface to one component is combined with a component using a different interface. A mapping from the methods, properties and events of the first interface to the methods, properties and events of the second interface occurs during the run-time of the client program.

Thus, dynamic mapping is a process allowing a client process using a particular component interface definition to use an alternative component defined by a different interface. Dynamic mapping occurs at run-time, when all of the information defining the component is available. The desired bean component object can be queried at run-time to provide the desired interface information. This information can then be used to map the bean's interface elements to semantically equivalent interface elements used in the client program.

The dynamic mapping described in the present invention provides for advantages not found in systems employing static mapping methods. First, dynamic mapping methods have access to all of the information about the mapped interface at run-time, and the information reflects the component's current state. For example, dynamic mapping can take advantage of type information describing objects and their constituent elements that is only available at run-time. Because static mapping occurs before the component's run-time, it does not have access to all of the component's data, resulting in reduced functionality. In addition, methods, properties and events added to the mapped component after the static mapping process has taken place are not available to a client program.

Second, dynamic mapping has access to methods, properties and events for both top-level class definitions and lower-level class definitions. Because it occurs at run-time, dynamic mapping can query any required object for its methods, properties and event, not just the top-level class object. Static mapping is limited to obtaining information from the source code and the registry, and is therefor only able to acquire data on top-level classes.

Finally, dynamic mapping does not require the use of extraneous files that must be administered and maintained. Dynamic mapping is automatically handled by virtual machines common to many interpreted languages. In contrast, static mapping produces files that must be moved to appropriate directories, imported into the computer's registry, or interpreted in addition to the source files defining the component. Dynamic mapping avoids this overhead because no extraneous files are produced.

The present invention describes devices, computers, computer-readable media, and systems of varying scope. In addition to the aspects and advantages of the present invention described here, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, an embodiment is described where the dynamic mapping is invoked for ActiveX methods other than "CoGetClassObject" and other related COM APIs that create instances using a class identifier (CLSID). In the fourth section, an embodiment of the invention describing the case where the dynamic mapping is the result of a call to the "CoGetClassObject" and related APIs using a CLSID is presented. Finally, in the fifth section, a conclusion of the detailed description is provided.

Hardware and Operating Environment

Figure 1:
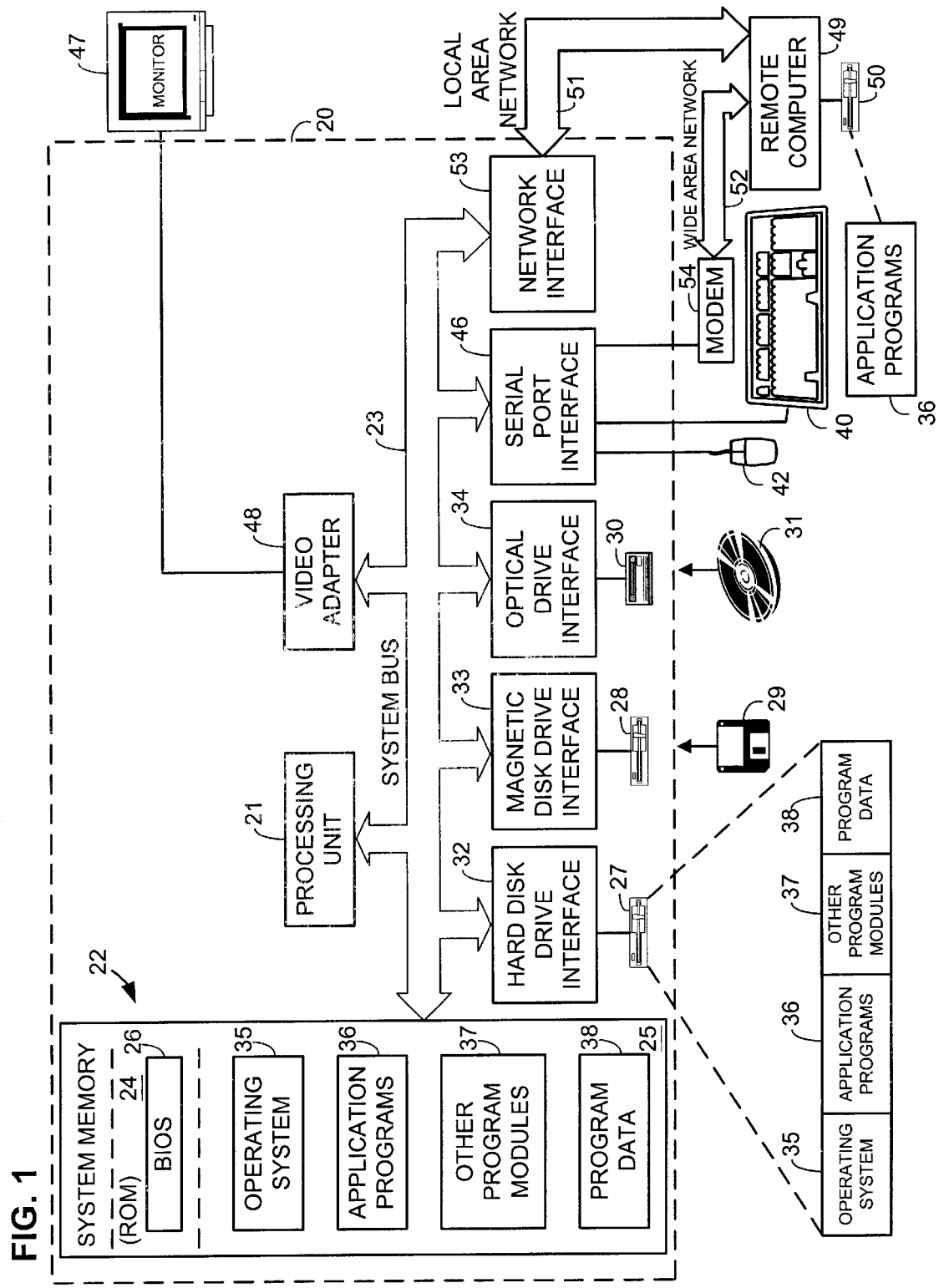
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2A:
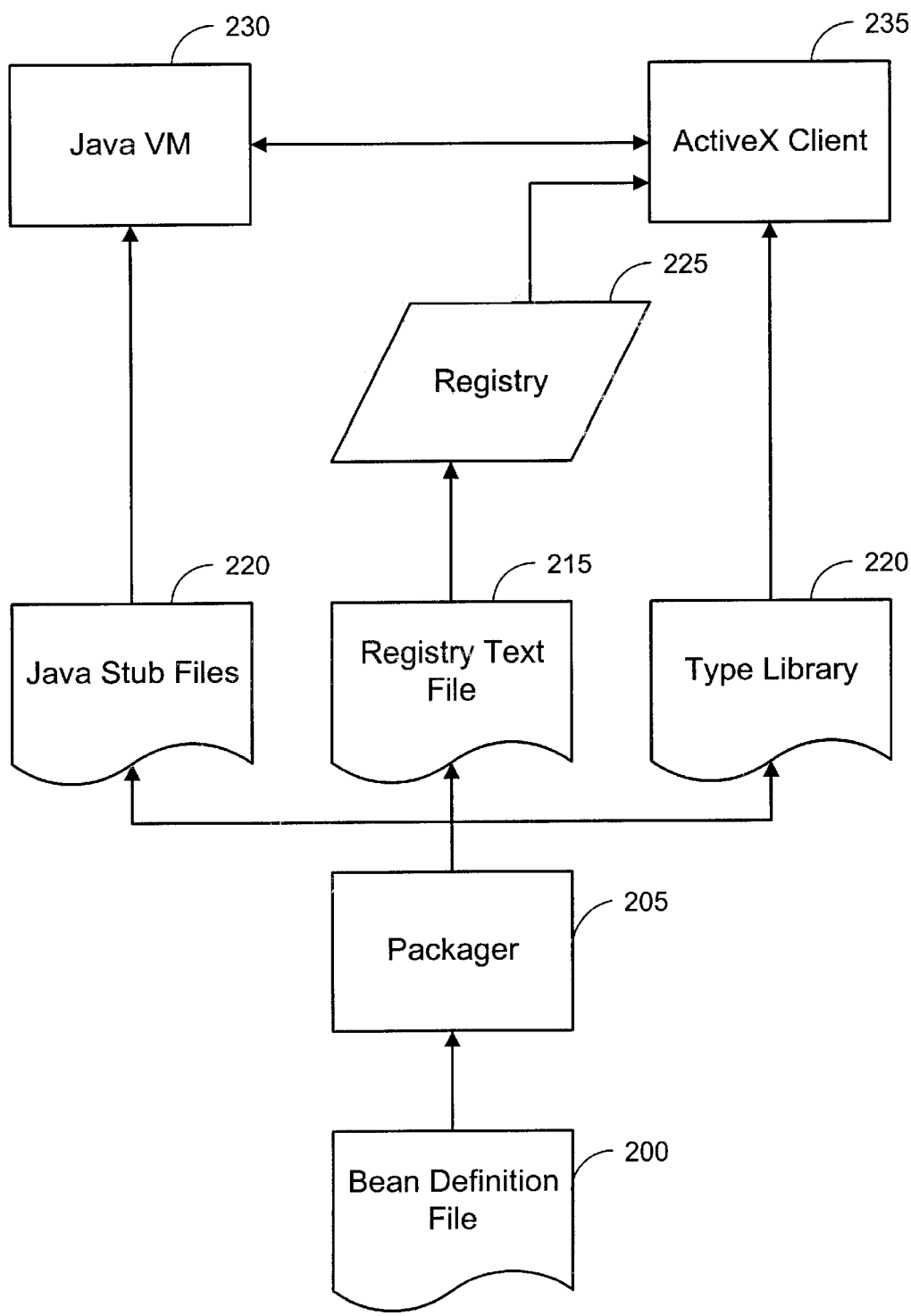
FIGS. 2(a) and 2(b) are diagrams illustrating a system according to one embodiment of the invention as compared to a system employing static mapping; and, FIGS. 3(a) and 3(b) are flowcharts of methods in accordance with an embodiment of the invention.
Figure 2B:
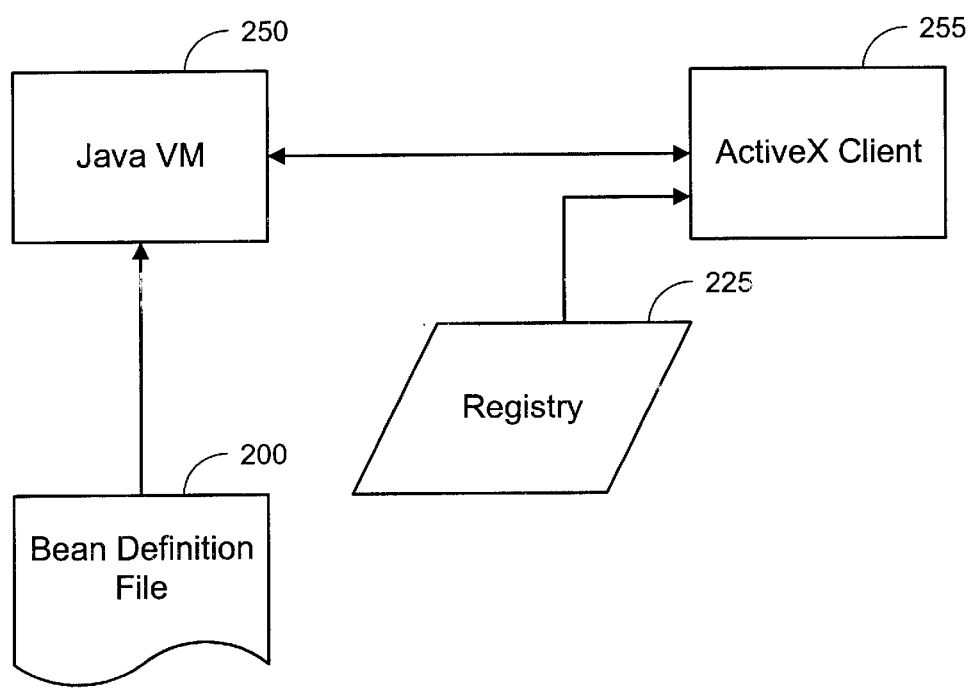

FIGS. 2(a) and 2(b) present a system level description of an embodiment of the invention as compared with previous solutions to the mapping problem. FIG. 2(a) shows a diagram of a system, per the prior art, in which the bean object is statically mapped to an ActiveX compatible object through the use of a packager application prior to running an ActiveX client application. FIG. 2(b) shows a diagram of the system according to an embodiment of the invention where bean objects are dynamically mapped at run-time to ActiveX control objects.

Referring first to FIG. 2(a), in accordance with the prior art, a Packager application 205 reads a Bean Definition File 200. The Packager 205 then produces three sets of output, a Type Library 210, a Registry Text File 215, and one or more Java Stub Files 220. The Type Library 210 contains a description of an ActiveX control's properties, events and methods. The Registry Text File 215 contains an identifier for the mapped object, a file path to the executable for the component and a file path to the type library. As a separate step, the Registry Text File must be imported into the computer's Registry 225 in order to notify the system that the mapped component is available for use. Java Stub Files 215 contain the computer interpreted instructions that statically map from a bean definition of a component to an ActiveX definition of a component. The Java Virtual Machine 230 is a native program running on an operating system, such as Microsoft Windows 95, that interprets and executes programs written in the Java programming language. The Java Stub Files 220 are read and interpreted by the Java Virtual Machine 230. Interpretation of Java programs is known in the art. Information regarding Java is described in the reference David Flanagan, "Java in a Nutshell: A Desktop Quick Reference," 2d edition, 1997 (ISBN 1-56592-262-X), which is hereby incorporated by reference.

Referring now to FIG. 2(b), in accordance with an embodiment of the invention, ActiveX Client Process 255 is an application that makes uses of components using an ActiveX Application Program Interface (API). ActiveX Client Process 255 interrogates the computer's Registry 225 to determine what components are available and for details on how to make use of the components. If ActiveX Client Process 255 desires to use a component that is in fact a bean, it communicates with a Java Virtual Machine 250 to invoke the desired component. Java Virtual Machine 250 is similar to the Java Virtual Machine 230, however Java Virtual Machine 250 has been modified in accordance with the present invention to dynamically map Java beans to ActiveX controls. Java Virtual Machine 250 then reads Bean Definition File 200 and dynamically maps the bean component definition to an ActiveX control definition. Details on the dynamic mapping process implemented within the Java Virtual Machine are now described in detail with reference to FIGS. 3(a) and 3(b).

Methods of an Exemplary Embodiment for Dynamically Mapping a Bean Object to a ActiveX Object The previous section presented a system level description of an embodiment of the invention. In this section, methods within an embodiment of the invention will be described with reference to a flowchart describing steps to be performed by computer programs implementing the method using computer-executable instructions. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer.

Figure 3A:
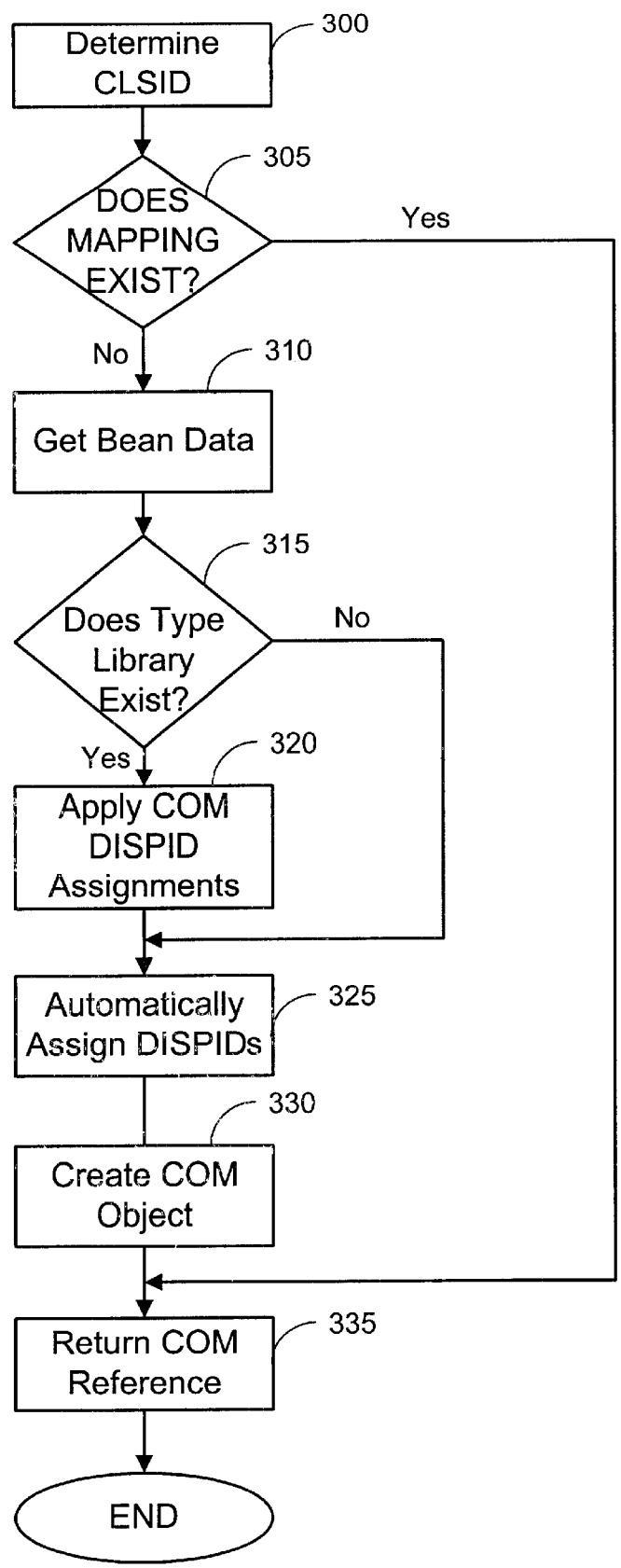

Referring now to FIG. 3(a), a flowchart for a computer implemented method to dynamically map JavaBean components to ActiveX components is presented. This method is executed when an ActiveX Client process 255 invokes an ActiveX method for a component that is implemented by a Java bean. Examples of COM methods which may require mapping a bean are "Itype::GetTypeInfo" and "Itype::GetClassInfo", each of which require a COM component object as a parameter. The method begins at 300 by determining the component object's class. This is accomplished by examining the class identifier (CLSID), if any, that was used to create the object.

The method then proceeds to 305 which checks whether or not a dynamic mapping has already been established for the CLSID from 300. If a dynamic mapping does not exist, 310 uses the "java.beans.Introspector" to retrieve the methods, events, properties and other data defined within the bean.

Next, at 315, the method checks the registry for an existing type library associated with the class specified by the CLSID. Preferably, the type library contains information about components and their interfaces, methods, properties, method arguments, and structures. If a type library does exist for the class, 320 applies any COM dispatch identifier (DISPID) assignments from the type library to the runtime mapping of DISPIDs to JavaBeans methods, properties and events. In one embodiment of the invention, the mapped DISPIDs are checked to make sure they do not conflict with commonly used DISPIDs. If there are conflicts, the mapped DISPIDs are adjusted to make them unique. This is generally necessary because some ActiveX clients have predefined expectations about the functionality provided by certain DISPID values and were not designed to be flexible.

At 325, an automatic assignment of DISPIDs to JavaBeans methods, properties and events is performed. In one embodiment of the invention, this assignment is based on the naming convention for a bean's methods, properties and events, and the functional description obtained at run-time from the type library.

Finally, at 335 a reference to a COM object is returned to the caller of the method and the method stops. If the check at 305 determined that a dynamic mapping did not already exist, the reference is to the object created at 330. Otherwise, the reference returned is to an object that was created in a previous dynamic mapping for the CLSID. Re-using the previously generated COM object is desirable because less memory and CPU resources are used.

Alternative Method of an Exemplary Embodiment for Dynamically Mapping a JavaBean to a COM Object The previous section described the general case where a COM method is invoked specifying a component that is implemented by a Java bean. This section describes processing that must take place when an ActiveX client calls COM methods that create component instances using a class identifier (CLSID), such as "CoGetClassObject", "CoCreateInstance", or other related APIs for a component that is implemented as a Java bean. Because the client only needs to know the CLSID, the client may be unaware that the component is implemented as a bean. The method is similar to that described in the previous section, with two differences. First, the CLSID is already known and does not have to be determined. Second, the method does not need to apply COM DISPID assignments from the type library.

Figure 3B:
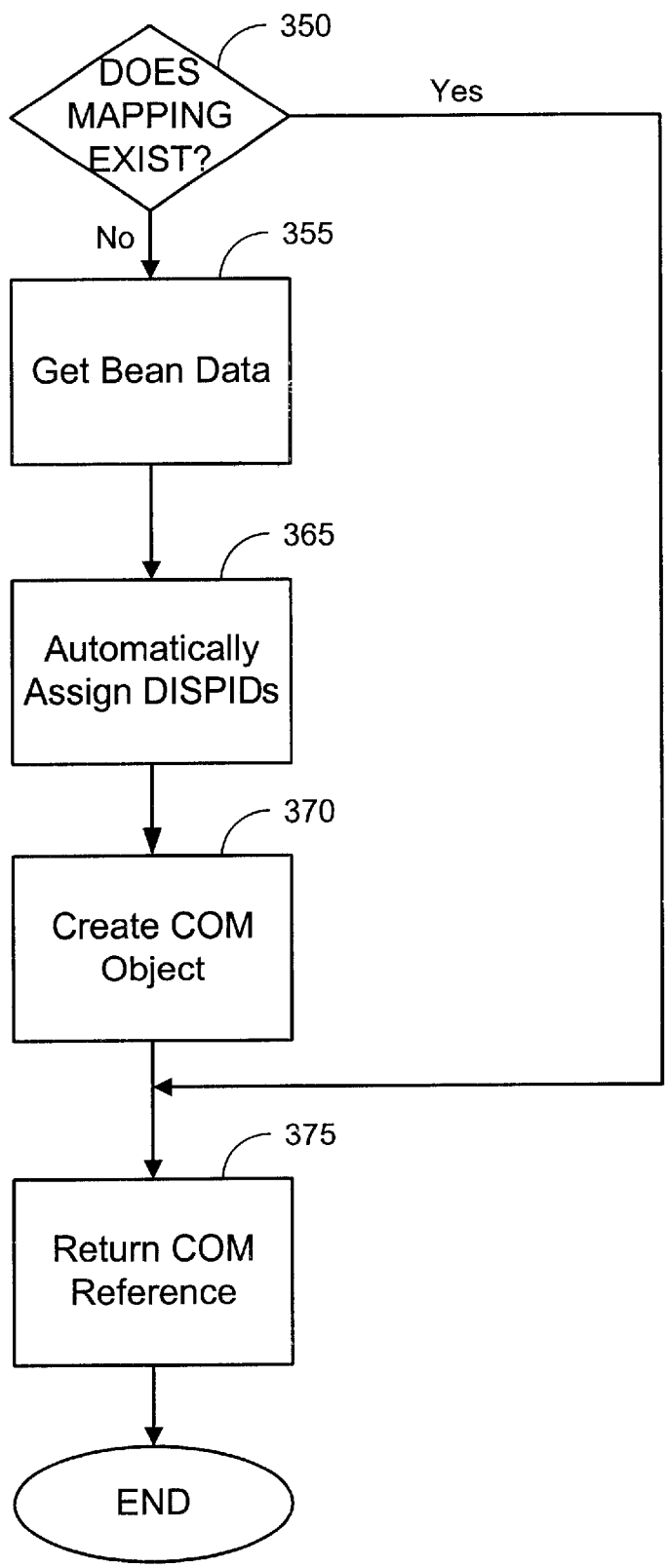

Referring now to FIG. 3(b), a flowchart for a computer implemented method to dynamically map a bean invoked as a result of a COM client call to CoGetClassObject and related APIs is presented. The method begins at 350 by checking if a dynamic mapping already exists to the Java class. If not, 355 obtains data on the bean's methods, properties and events using the "java.beans.Introspector." The method proceeds to 360 which applies an automatic assignment of DISPIDs to JavaBean methods, properties and events. These values are dynamically mapped in the same manner as described with reference to FIG. 3(a).

Next, 370 creates a COM object that implements conventional ItypeLib and ItypeInfo interfaces using and wraps the data gathered at 355 and 365.

Finally, 375 returns a reference to a COM object. If the check at 350 determined a mapping did not already exist, the reference returned is to the object created at 370. Otherwise, the reference returned is to the previously created object.

Conclusion

The dynamic mapping of an ActiveX control to a Java bean has been described. In particular, systems and methods of creating a mapping using information gathered at run-time from a Java bean component have been described. Although specific embodiments have been illustrated and described herein, it will be appreciated by those of ordinary skill in the art that any arrangement which is calculated to achieve the same purpose may be substituted for the specific embodiments shown. For example, the systems and methods described herein could be applied to component model interfaces other than ActiveX or JavaBeans. This application is intended to cover any adaptations or variations of the present invention. Therefore, it is manifestly intended that this invention be limited only by the following claims and equivalents thereof.

We claim:

1. A computerize system comprising:
   an operating system providing a first interface structured according to a first object model for controlling a first component structured according to the first object model and a second interface structured according to a second object model for controlling a second component structured according to the second object model, said first interface and said second interface each having methods and properties;
   at least one client program utilizing said first interface to invoke a first method on the first component at run-time but instead invoking a second method on the second componet;
   a runtime queriable component defined in the second object model; and
   a data structure representing a mapping from methods and properties of said first interface to methods and properties of said second interface, said mapping data structure generated at least in part with a query made on the runtime queriable component;
   wherein the first object model is different from the second object model.

2. A computerized method form dynamically mapping a first component having an interface defined in accordance with a first object model comprising methods and properties to a second component having an interface defined in accordance with a second object model comprising methods and properties, the computerized method comprising:
   receiving a request for the interface of said first component from a third component statically complied to access the interface of said first component;
   generating an object representing said first component;
   dynamically querying at run-time said second component for its methods properties to create a set of source data;
   populating said object with said source data;
   providing said requesting third component an interface of said object instead of the interface of said first component; and
   executing a method of said second component in response to receiving a request on the interface provided to said third component.

3. The computerized method of claim 6, further comprising: generating a data structure containing a plurality of entries respresenting the mapping between said first component interface and said second component interface, said entries each containing a dynamic method invocation dispatching identifier; and
   adjusting said dispatching identifier to eliminate conflicts with the dispatching identifiers in the plurality of entries.

4. A computer-readable medium having computer-executable instructions for performing a method comprising the steps of:
   defining a first component having an interface defined in accordance with a first object model comprising methods and properties;
   defining a second component having an interface defined in accordance with a second object model comprising methods and properties, said second model being different from said first object model;
   generating an object representing said first component;
   querying dynamically at run-time said second component for its methods properties to create a set of source data;
   populating said object with said source data;
   response to receiving a request for said first component interface, providing a reference to said object; and
   executing a method of said second component in response to receiving a request on the provided reference to execute a method of said first component.

5. The computer-readable medium of claim 4 further having computer-readable instructions for performing the steps of:
   generating a data structure containing a plurality of entries respresenting the mapping between said first component interface and said second component interface, said entries each containing a dynamic method invocation dispatching identifier; and
   adjusting said dispatching identifier to eliminate conflicts with the dispatching identifiers in the plurality of entries.

6. A computer comprising:
   a processor;
   a computer-readable medium; and
   an operating system executed by the processor and providing:

a first interface structured accordance with a first object model for controlling a first component and a second interface structured in accordance with a second object model for controlling a second component, said first interface and said second interface each having methods, properties and events, said second object model being different from said first object model;

at least one client program attempting to utilize said first interface to control said first component and controlling instead said second component;

a queriable component defined in the second interface; and a data structure respresenting a mapping from the methods, properties and events of said first interface to the methods, properties and events of said mapping data structure being generated through queries on the queriable component dynamically during the run-time of the client program.

7. A method for dynamically mapping run-time requests between components constructed according to different objects models, where a first component constructed according to a first object model requests invocation of a first method of a second component constructed according to the first object model and the request is implemented by a second method of a third component constructed according to a second object model, the method comprising:

receiving a request from the first component to invoke the first method;

obtaining an interface element description of the second component;

dynamically obtaining an interface element description for the methods available on the third component from a queriable interface defined in the second object model; and dynamically invoking the second method when the first object invokes the first method.

8. A method for dynamically mapping run-time requests between components structured according to different objects models, where a first component structured according to a first object model invokes method on a second component structured according to the first object model and the invoked methods are implemented by methods of a third component constructed accordance with a second object model, the method comprising:

receiving a request from the first component, for a reference to the second component;

obtaining type library information about the second component; and dynamically invoking a method in the second object model to determine invocable methods available on the third component during the run-time of the first component; and dynamically mapping a method in the second component to a method in the third component.

9. The method of claim 8, further comprising:

creating a mapping data structure that holds mappings from the first method to the second method; and returning a reference to the wrapper to the first component.

10. The method of claim 9, further comprising:

maintaining a record holding the reference to the mapping data structure;

receiving a request for a reference to the second component from a next component structured according to the first object model; and returning to the mapping data structure to said next component.

11. A method for dynamically mapping requests made between components constucted according to a different object models, a run-time environment comprising a type library for discovering type information about components constucted according to the first object model, a forst component defined according to a first object model executing in a client process, the client process further containing an indication that a second component defined according to the first object model is to be implemented by a third component defined according to a second object model, the third component haveing distinguishing type information about it's methods and properties discoverable at run-time through methods provided by a fourth components defined according to the second object model, the third and fourth components ant their corresponding methods executing under control of a server process comprising a virtual machine that provides a run-time environment for components defined according to the second object model, the method comprising:

receiving a request from the first component for an instant of the second component;

determining from the type library, the methods and properties provided by the second component;

discovering the methods and properties available for the third component by calling a method of the fourth component;

determining from naming convemtions of the first and second object model, a mapping of methods in the second component to methods in the third component;

dynamically creating a data structure to hold the determining mappings;

receiving a request to execute a method on the second component, and invoking a method of the third component indicated in the data structure.

12. A computerized system comprising:

an operating system providing a first interface for controlling a first component and a second interface for controlling a second component, said first interface and said second interface each having methods and properties;

at least one client program utilizing said first interface to invoke a first method on the first component at run-time but instead invoking a second method on the second component; and a data structure representing a mapping from methods and properties of said first interface to methods and properties of said second interface, said mapping data structure being dynamically generated during the run-time of the client program;

wherein the first interface is structured differently from the second inteface.

* * * * *

UNITED STATES PATENT AND TRADEMARK OFFICE
CERTIFICATE OF CORRECTION

PATENT NO.    : 6,438,744 B1
DATED         : August 20, 2002
INVENTOR(S)   : Sharpe et al.

It is certified that error appears in the above-identified patent and that said Letters Patent is hereby corrected as shown below:

<u>Title page,</u>
Item [56], OTHER PUBLICATIONS, "Develpment" should read -- Development --.
"Harmon, T., "Java SDK 2.0: A Two-Way Bridge Between ActiveX and Java", Article [retrieved on Jun. 20, 2000], 1-11, (1998)." should read -- "Harmon, T., "Java SDK 2.0: A Two-Way Bridge Between ActiveX and Java", Article [online] Microsoft Corporation [retrieved on Jun. 20, 2000], 1-11, (1998)." --.

<u>Column 10,</u>
Line 2, "form" should read -- for --.
Line 14, "methods properties" should read -- methods and properties --.
Line 23, "6" should read -- 2- --.
Line 40, "second model" should read -- second object model --.
Line 56, "respresenting" should read -- representing --.

<u>Column 11,</u>
Line 15, "respresenting" should read -- representing --.
Line 17, "of said" should read -- of said second interface, said --.
Lines 23 and 42, "objects" should read -- object --.
Line 43, "method" should read -- methods --.

<u>Column 12,</u>
Line 11, "constucted" should read -- constructed --.
Line 11, "to a different" should read -- to different --.
Line 14, "constucted" should read -- constructed --.
Line 14, "forst" should read -- first --.
Line 20, "haveing" should read -- having --.
Line 22, "components" should read -- component --.
Line 24, "ant" should read -- and --.
Line 29, "instant" should read -- instance --.
Line 36, "convemtions" should read -- conventions --.

UNITED STATES PATENT AND TRADEMARK OFFICE
CERTIFICATE OF CORRECTION

PATENT NO.   : 6,438,744 B1
DATED        : August 20, 2002
INVENTOR(S)  : Sharpe et al.

It is certified that error appears in the above-identified patent and that said Letters Patent is hereby corrected as shown below:

Column 12 cont'd,
Line 40, "determining" should read -- determined --.
Line 61, "inteface" should read -- interface --.

Signed and Sealed this

Twenty-eighth Day of January, 2003

JAMES E. ROGAN
*Director of the United States Patent and Trademark Office*